(12) United States Patent
Sweazy

(10) Patent No.: US 8,908,869 B2
(45) Date of Patent: Dec. 9, 2014

(54) ANCHOR POINT FOR DIGITAL CONTENT PROTECTION

(71) Applicant: Seagate Technology LLC, Cupertino, CA (US)

(72) Inventor: Paul Marvin Sweazy, Lyons, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/686,435

(22) Filed: Nov. 27, 2012

(65) Prior Publication Data

US 2013/0089207 A1    Apr. 11, 2013

Related U.S. Application Data

(63) Continuation of application No. 12/360,792, filed on Jan. 27, 2009, now Pat. No. 8,325,927.

(51) Int. Cl.
*H04L 9/08* (2006.01)

(52) U.S. Cl.
USPC ........................................... 380/283

(58) Field of Classification Search
USPC ........................................... 380/283
See application file for complete search history.

(56) References Cited

U.S. PATENT DOCUMENTS

| | | | |
|---|---|---|---|
| 6,978,017 B2 | 12/2005 | Wiener et al. | |
| 7,441,121 B2 | 10/2008 | Cutter et al. | |
| 7,526,451 B2 | 4/2009 | Park et al. | |
| 7,577,999 B2 | 8/2009 | Narin et al. | |
| 7,706,540 B2 | 4/2010 | Fransdonk et al. | |
| 7,715,564 B2 | 5/2010 | Nakahara et al. | |
| 7,716,487 B2 | 5/2010 | Venkatesan et al. | |
| 7,778,417 B2 | 8/2010 | Rutkowski et al. | |
| 7,801,819 B2 | 9/2010 | Swenson et al. | |
| 8,325,927 B2 * | 12/2012 | Sweazey | 380/286 |
| 8,539,240 B2 * | 9/2013 | Sweazey | 713/176 |
| 2003/0198351 A1 | 10/2003 | Foster et al. | |
| 2004/0054920 A1 | 3/2004 | Wilson et al. | |
| 2005/0120232 A1 | 6/2005 | Hori et al. | |
| 2006/0059573 A1 | 3/2006 | Jung et al. | |
| 2006/0085353 A1 | 4/2006 | Wang et al. | |
| 2006/0235801 A1 | 10/2006 | Strom et al. | |
| 2006/0282681 A1 | 12/2006 | Scheidt et al. | |
| 2006/0282899 A1 | 12/2006 | Raciborski | |
| 2007/0198419 A1 * | 8/2007 | Park et al. | 705/52 |
| 2008/0098481 A1 | 4/2008 | Lee et al. | |
| 2008/0126801 A1 | 5/2008 | Lee et al. | |
| 2009/0016533 A1 * | 1/2009 | Jung et al. | 380/277 |
| 2009/0193254 A1 * | 7/2009 | Sweazey | 713/175 |
| 2010/0024044 A1 * | 1/2010 | Ganesan | 726/27 |
| 2011/0179279 A1 * | 7/2011 | Greevenbosch et al. | 713/176 |

\* cited by examiner

*Primary Examiner* — Matthew Smithers
(74) *Attorney, Agent, or Firm* — Cesari & Reed LLP; Kirk A. Cesari; David K. Lucente

(57) ABSTRACT

Digital rights management (DRM) can be implemented through use of an anchor point based digital rights management system. In one embodiment, a device may comprise an anchor point circuit including a memory and a processor. The processor may be configured to receive a title key from a digital content provider, the title key used to encrypt a digital property to produce an encrypted digital property. The processor may be further configured to generate a binding key, encrypt the title key with the binding key to produce a title pre-key, and store the binding key in the memory. In another embodiment a system may comprise an interface configured to communicate with a content provider, and an anchor point circuit configured to bind a digital property received from the content provider to the anchor point circuit such that the digital property can only be used in conjunction with the anchor point circuit.

24 Claims, 5 Drawing Sheets

ANCHOR POINT FOR DIGITAL CONTENT PROTECTION

CROSS REFERENCE TO RELATED APPLICATIONS

The present application is a continuation of and claims priority to pending U.S. patent application Ser. No. 12/360,792, entitled ANCHOR POINT-BASED DIGITAL CONTENT PROTECTION WITH AN ESCROW ANCHOR POINT, filed on Jan. 27, 2009, which claims priority to Provisional Patent Application No. 61/024,174, entitled ANCHOR POINT-BASED DIGITAL RIGHTS MANAGEMENT, filed on Jan. 28, 2008, the contents of which are hereby incorporated by reference in their entirety.

BACKGROUND

Digital property is an evolving economic and legal concept that challenges modern technological and legal frameworks. Generally, digital property refers to any digital data that has some manner of ownership attached to it, for example, through copyright protection, trade secret protection, etc. In a typical copyright scenario, copyrights in an original work of authorship (e.g., a photograph) may be attributed to the author (e.g., the photographer). Furthermore, the work may be embodied in the form of digital data (e.g., a digital image file), the copying, distribution, derivation, etc. of which are exclusively within the rights of the author. Accordingly, each instance of the digital data (e.g., each copy of the digital image file) is an instance of the digital property of that author.

The exclusive rights associated with digital property may be transferred (e.g., assigned to another) or licensed for use by others. For example, the photographer may license another party to use a digital image on the party's website, subject to certain limitations to which the parties have agreed. However, once the digital image file is copied and transferred out of the author's control, there is risk the digital image file can be lost or corrupted. Accordingly, Digital Rights Management (DRM) technologies are continually being developed to facilitate technological and legal control digital property rights and protections against loss or corruption of the digital property.

However, existing DRM approaches to protect against loss or corruption of data have proven inadequate, costly, invasive, and inconvenient to the digital property owners and/or the licensed users. For example, a large digital music vending service recently announce its termination of music vending activities, raising the possibility that customers of the service may lose the rights and ability to listen to the music that they "purchased" (e.g., licensed).

Accordingly, digital property ownership remains exposed to the possibility of loss or corruption of the digital content, and so, consumers remain suspicious of protection schemes for digital property. These incompatible factors amplify the transactional costs associated with distributing, protecting, and storing digital content.

SUMMARY

In one embodiment, a device may comprise an anchor point circuit including a memory and a processor. The processor may be configured to receive a first instance of a title key from a digital content provider, the title key used to encrypt a digital property to produce an encrypted digital property. The processor may be further configured to generate a binding key, encrypt the first instance of the title key with the binding key to produce a title pre-key, and store the binding key in the memory.

In another embodiment, a method may comprise encrypting a title key with a binding key in a first anchor point circuit to produce a title pre-key, the title key used to encrypt a digital property. The method may further comprise providing the title pre-key from the first anchor point circuit to a user device associated with the first anchor point circuit, and storing the binding key in a secure memory of the first anchor point circuit.

In yet another embodiment a system may comprise an interface configured to communicate with a content provider, and an anchor point circuit. The anchor point circuit may be configured to bind a digital property received from the content provider to the anchor point circuit such that the digital property can only be used in conjunction with the anchor point circuit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
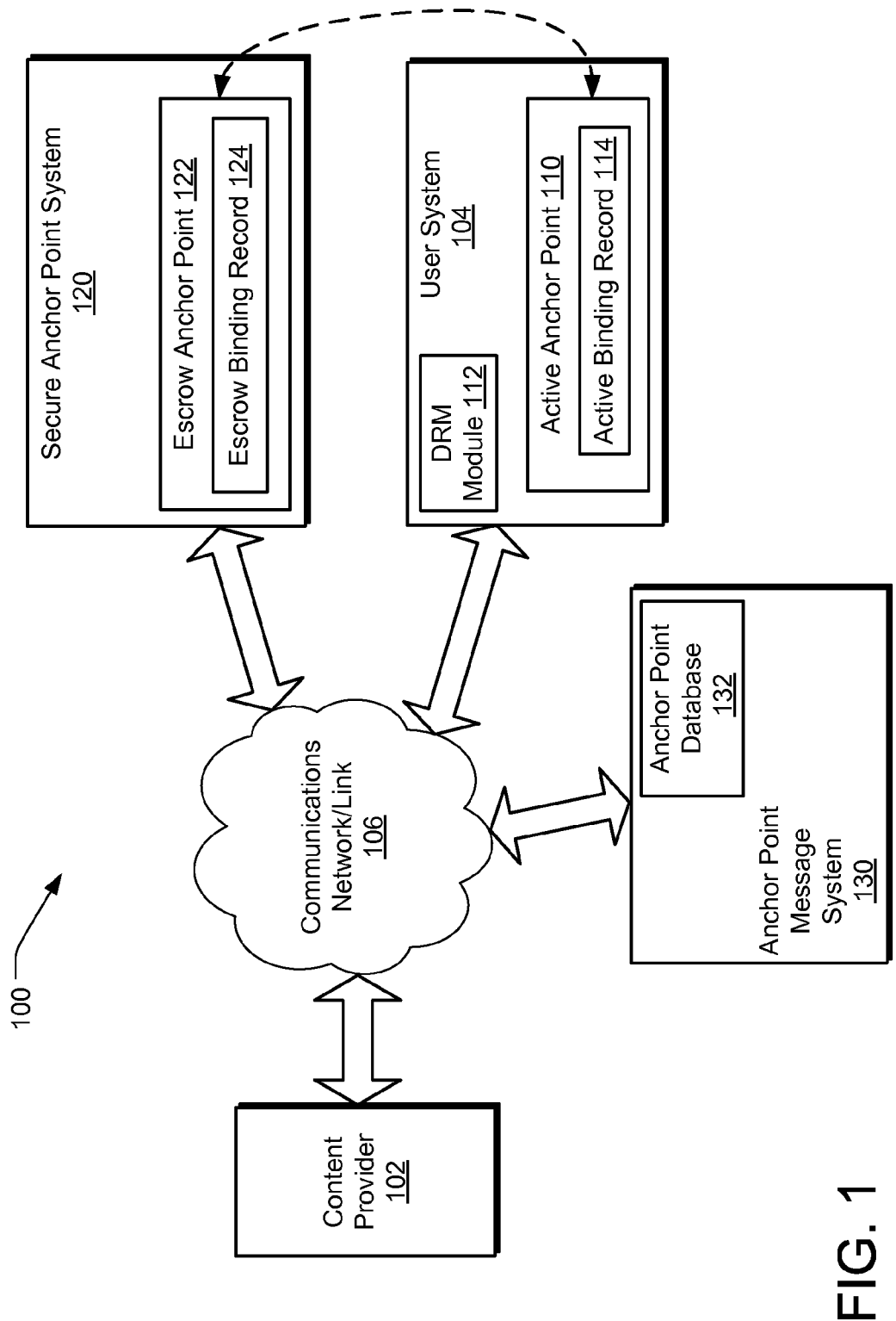
FIG. 1 illustrates an example anchor point based digital rights management environment with an escrow anchor point.

Implementations described and claimed herein resolve the foregoing concerns by applying an escrow system to protect against loss or corruption of a user's rights to use digital property. The escrow system increases confidence that the "purchased" rights and ability to use digital property will not be lost or corrupted beyond the point that the purchaser can no longer recover those rights and abilities. For example, a user may purchase licensed rights to use digital music on a computer and an MP3 player. The definition of these licensed rights may be communicated with the digital property upon the purchase and bound to a secure system or service that is separate from the content vendor (e.g., a user's anchor point). Furthermore, the binding may also be "backed up" to a secure escrow system or service for additional safety.

In certain implementations, technology described herein binds the transferred rights to a secure, unique, hard-to-falsify physical object (called an "anchor point") using a secured binding record. A primary or "active" binding record binds the transferred rights of a particular digital property instance to an "active" anchor point (e.g., to the primary anchor point contacted when a user is attempting to use some protected digital content). Furthermore, a substantial copy of the active binding record, called the "escrow" binding record, is also generated and stored to a different/separate secure secondary object (called an "escrow anchor point"). The escrow binding record acts as a "backup" of the active binding record in case the active binding record is lost or corrupted. The active binding record can be restored using the escrow binding record, and vice versa. In addition, active and escrow binding records can be moved from one anchor point to another in certain circumstances.

In one implementation, an anchor point is embodied in a highly secure, robust circuit device. The rights are secured in association with the physical anchor point (e.g., the computing or storage device in which the anchor point resides) rather than any individual instance of the digital property—the rights are bound by an active binding record to the physical active anchor point device rather than to the individual instance of the digital property itself In addition, a substantial copy of the active binding record is stored in a separate escrow anchor point. In another implementation, one or both of the active and escrow anchor points are embodied as part of secure online anchor point services.

The logical scope or "domain" in which an anchor point controls use of digital content is called the "anchor point domain". Traditional and future DRM approaches may be applied within an anchor point domain to manage the specific rights available, but the rights to use the digital property cannot easily leak outside the anchor point domain.

In one implementation, an instance of the digital property is typically an encrypted digital data file, object, or stream. Given the appropriate encryption key, a content handler (e.g., a media player) can use the digital property instance and present (e.g., play) it to a user within the rights granted in association with the anchor point. To obtain the appropriate decryption key (referred to herein as a "title key") for a particular digital property instance, a content handler resides within the anchor point domain of that digital property instance, such that the content handler has access to the active anchor point. Furthermore, in the event of invalidation (e.g., loss or corruption) of the active binding record in an active anchor point, an escrow anchor point may be contacted to restore use of the digital property, such as by restoring the active binding record based on the escrow binding record. As such, the rights are managed through and bound to the active anchor point and escrow anchor point, rather than the digital property instance itself or some communication connection with a DRM service of the publisher, thereby increasing the convenience to the user.

Digital data stored in any storage media is inherently at risk of loss or corruption. In one implementation, use of data digital property instance is achieved through use of a secure device referred to herein as an "anchor point" or "active anchor point" (so called because it actively participates in protection and use of the digital property instance). The anchor point stores an "active binding record" that binds the rights to use the digital property instance. Protection against loss or corruption of the binding information stored in the active anchor point is achieved by a backup secure device referred to herein as an "escrow anchor point," which stores a substantial copy of the active binding record, called an "escrow binding record". Both the active binding record and the escrow binding record may be created from binding data by individual anchor points or by a content provider, both of which may be referred to as "binding record data sources".

The term "active anchor point" refers to an anchor point in its role of storing a primary (i.e., active) instance of a binding record, and the term "escrow anchor point" refers to an anchor point in its role of storing a backup (i.e., escrow) instance of the binding record. Notwithstanding the foregoing, an individual anchor point may concurrently act as an active anchor point for one digital property instance and as an escrow anchor point of a different digital property instance, by storing the active binding record for the first digital property instance and storing the escrow binding record for the second digital property instance.

In one implementation, active and escrow anchor points are highly secure circuit devices that may be incorporated into computing devices, such as computers, mobile phones, hard drives, monitors, audio players or components, set top boxes, network appliances, personal digital assistants (PDAs), televisions, digital picture frames, etc. Active and escrow anchor points may be part of local consumer devices or may be provided by a remote server through an online service.

FIG. 1 illustrates an example anchor point based digital rights management environment 100 with an escrow anchor point. A content provider 102, such as an online digital music or video rental service, an online digital music or video vending service, a digital music or video vending kiosk, etc., markets digital content for use by consumers. A common scenario for acquiring digital property may include a user system 104 that connects over a communications network 106, such as the Internet, to a service site, such as a website operated by the content provider 102. In an alternative implementation, the consumer may connect a user system 104 (e.g., his or her mobile media player) through a communications link 106 directly to a vending kiosk operated by the content provider 102, such as by use of a USB cable or wireless connection (e.g., Wi-Fi, Bluetooth, mobile phone technology, etc.). It should be understood that a user may have multiple systems within his or her anchor point domain, such as a mobile phone, laptop computer, and desktop computer, all of which can access the active anchor point to use a particular digital property instance.

Typically, a goal of the content provider 102 is to provide content (e.g., digital music, images, video, text, software, data, etc.) for use by a consumer, subject to certain restrictions on use, copying, distribution, etc. Furthermore, the consumer typically intends to obtain the content for playing, viewing, and/or other allowable uses. Additionally, the consumer may intend to backup or store the content to avoid unintended loss of the content and his or her rights and ability to use it. For example, the consumer may wish to obtain a digital movie by downloading it from the content provider 102 to his or her user system 104 through the communications network 106 and then play the digital movie from the user system 104. In another example, the consumer may wish to backup the digital movie and/or the data that allows the user to use the digital movie obtained from the content provider 102.

Within the illustrated environment, the user system 104 includes a secure active anchor point 110 that controls the consumer's ability to use the content. In one implementation, the content provider 102 interacts with the active anchor point 110 to encrypt the content in such a way that the active anchor point 110 provides information for the decryption of the content for presentation to the consumer. The interaction is memorialized in the active anchor point 110 in the form of an active binding record 114 stored securely within the active anchor point 110.

The active anchor point 110 in FIG. 1 is shown as a secure device in the user system, such as a microelectronics chip mounted on the motherboard of the user system 104, a microelectronics chip mounted in the hard disc drive installed in or accessible to the user system 104, etc. In alternative implementations, remote anchor points may be implemented as anchor point services accessible by a user system.

The content provider 102 interacts with the active anchor point 110 to establish a title key that is required to decrypt the content provided by the content provider 102 in an encrypted form. As such, when the user wishes to use the content received from the content provider 102, subject to the licensing terms managed by a digital rights management (DRM) module 112 of the user system 104, the active anchor point 110 generates a title key based from the active binding record 114 associated with the content and passes the title key to a secure content handler to use the content. In this manner, use (e.g., presentation) of the digital content depends upon the active anchor point 110 and the active binding record 114 maintained by the active anchor point 110.

In an alternative implementation, also shown within the illustrated environment, a secure anchor point system 120 includes a secure escrow anchor point 122 that is communicatively linked to the active anchor point 110. The secure anchor point system 120 represents an escrow anchor point that provides storage of a backup or escrow copy of the binding record for the content (e.g., an escrow binding record).

The escrow anchor point 122 in FIG. 1 is shown as a secure device in the secure anchor point system 120, such as a microelectronics chip mounted on the motherboard of the user system 104, a microelectronics chip mounted in the hard disc drive installed in or accessible to the anchor point management registry system 120, etc. In alternative implementations, escrow anchor points may be implemented as escrow anchor point services accessible by a user system through an online service.

The escrow anchor point 122 interacts with the active anchor point 110 to establish an escrow binding record 124 sufficient to restore the active binding record 114 as needed. As such, if the active binding record 114 were to become lost or corrupted, or if the user system 104 including an active anchor point 110 were to be lost or compromised, then a user could contact the secure anchor point system 120 to access the escrow binding record 124 and thereby regain access to the information contained in the active binding record 114.

For example, assume a user has "purchased" digital content that he or she is storing and using via a smart phone. In this example, the user may have an active anchor point 110 that contains an active binding record 114 that allows the user to decrypt and use the digital content on the phone (e.g., user system 104). For the sake of this example, assume the user loses the phone. The user may contact the secure anchor system 120 to restore the active binding record in a replacement phone.

However, the logistics involved in both disabling the active binding record in the lost phone and restoring the active binding record in the replacement phone can be implemented in a variety of ways. In one implementation, the user may contact a centralized or distributed anchor point message system 130 to report the loss of the phone (and therefore the loss of the active binding record). The anchor point message system 130 includes a database 132 of invalid anchor points, which may be identified using various types of anchor point identifiers, such as globally unique identifiers (GUIDs), URLs, etc. Invalid anchor points represent anchor points that are identified as invalid because of loss, destruction, security breach, etc. The database 132 maintains a record of these invalid anchor points for use in managing digital content rights on a global or local scale.

Thereafter, the anchor point message system 130 would transmit instructions for the lost phone to erase or disable the active binding record 114 on the lost phone to prevent an unauthorized "finder" of the lost phone from obtaining free, unfettered use of the digital content. Although the finder would have use of the digital content for a time, as soon as the finder connects the lost phone to the content vendor's system or to some other service that can access the anchor point message system 130, the anchor point message system 130 would issue the instructions to disable the active binding record 114 (and likely all binding records stored in the active anchor point 110, whether active or escrow binding records. In one implementation, any message from the anchor point message system 130 to the active anchor point 110 that includes notification that the active anchor point 110 has been registered as invalid in the anchor point database 132 may be considered one of the aforementioned erasure or disabling instructions and results in invalidation of all active and escrow binding records in the active anchor point 110, including active binding record 114.

In response to receipt of these instructions, the lost phone disables the active binding record in some way, such as by instructing the active anchor point of the phone to delete the binding record and/or related binding information, to set a flag indicating that the binding record is now invalid, etc. Thereafter, the phone will not be able to use the associated content through the formerly active anchor point, which is now invalid for that content. It should be understood that the lost phone may be caused to disable all binding records it possesses, including all active and escrow binding records associated with other content.

To continue this example, assume the user then finds his or her phone or purchases a replacement phone. As the anchor point message system 130 sent an instruction to the phone earlier to erase or disable its active binding record 114, the found phone can not use the digital property. Alternatively, the replacement phone has no binding records and therefore cannot use the digital property. In such instances, the user may contact the escrow anchor point 122 to restore the active binding record 114 of the user system 104. In one implementation, the new or found active anchor point 110 sends a request to the escrow anchor point 122 requesting a restored active binding record 114 and identifying itself with a new anchor point identifier. If the escrow anchor point 122 restores a new instance of the active binding record 114 in the active anchor point 110, the new anchor point identifier of the active anchor point 110 is stored in both the escrow binding record 124 of the escrow anchor point 122 and in the new active binding record 114 in the active anchor point 110.

In one example, to identify which escrow anchor points to contact for restoration of the active binding records contained within the active anchor point 110, the user maintains a database identifying the locations and identifiers of its escrow binding records, such as using a binding record backup application. The application can maintain a directory database of these locations and identifiers and send out "restore" commands to each location for each identifier. Other mechanisms may also be employed.

In one implementation, an active anchor point for an active binding record periodically checks the escrow anchor point storing the corresponding escrow binding record to ensure that the escrow binding record is still valid and accessible. If the active anchor point discovers the escrow binding record is no longer valid or accessible, then the active anchor point can create a new escrow binding record and inform an anchor point message system that the escrow anchor point is no longer valid.

Before restoring the active binding record 114 of the user system 104, the escrow anchor point 122 checks with the anchor point message system 130 to confirm that the active anchor point 110 has been reported as invalid in the anchor point database 132. The escrow anchor point 122 uses the original active anchor point's identifier, which is stored in the escrow binding record 124 to determine whether the anchor point has been disabled. If the active anchor point has been reported as invalid, the escrow anchor point 122 learns (e.g., receives notice) from the anchor point message system 130 that the identified (old) active anchor point 110 is indeed invalid and therefore sends back to the new active anchor point 110 binding data sufficient to create a new active binding record 114 in the new active anchor point 110. In one implementation, the new active anchor point 110 creates the new active binding record 114 using this binding data (e.g., one or more of binding record identifiers (IDs), a binding record passkey, a binding key, one or more signing keys, an output security level, etc.). In an alternative implementation, the escrow anchor point 122 creates the new active binding record and sends it back to the new active anchor point 110. In one implementation, each binding record includes a URL to the anchor point holding its counterpart binding record, the identifier of its counterpart binding record, and its own binding record identifier, although other combinations of data may be employed.

Unlike the secured binding records, the lost digital content itself can be restored via any backup and restore system. As such, once the phone has received sufficient data to restore the active binding record 114 (e.g., sufficient binding data or a new active binding records itself), the phone may use the restored digital content again through the restored binding record 114 in the active anchor point 110.

The user system 104, the secure anchor point system 120, the anchor point message system 130, and the content provider 102 may be communicatively linked to allow for transmission of encrypted digital property instances, rights objects associated with the encrypted digital property instances between the systems, keys, messages, data sufficient to generate and/or restore binding records, etc. Communications between anchor points 110 and 122 are generally done through secure communications links, although aspects of the described technology may still work if the security of the communications links is not robust. Particularly, other communications, such as downloads and backups of rights objects and encrypted digital property instances, etc., work even if the communications links are not secure. Additionally, some communications between the anchor points 110 and 122 may not be secure. Generally, a secure communications link is characterized by mutual authentication by public key certificate exchange, session key agreement, and subsequent communication using symmetric encryption, although other secure communications may also be employed.

Figure 2:
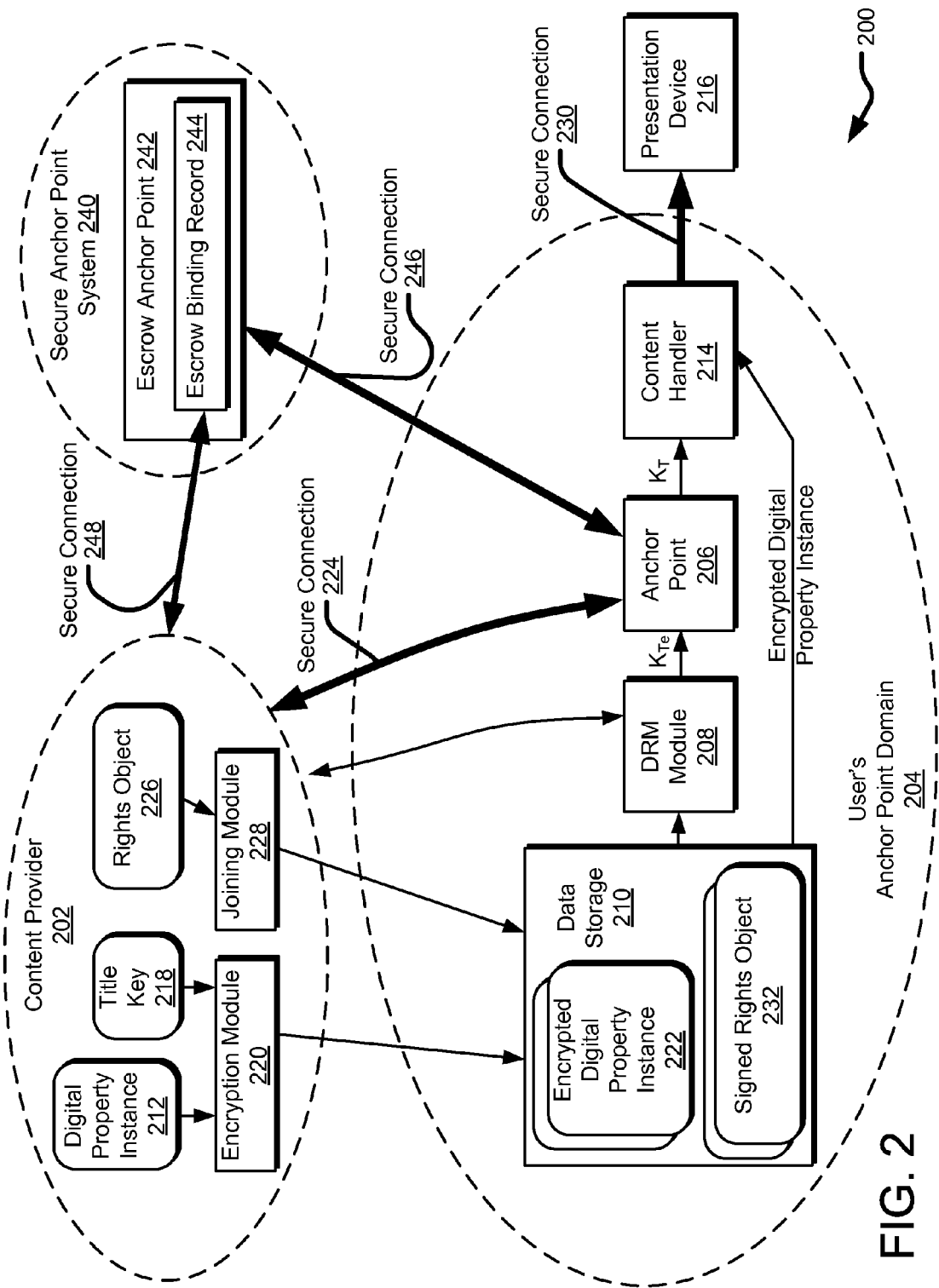
FIG. 2 illustrates certain detailed components and functionalities of an example architecture of an anchor point based digital rights management environment.

FIG. 2 illustrates certain detailed components and functionalities of an example architecture of an anchor point based digital rights management environment 200. A content provider operates in a secure environment 202, from which the content provider can create and issue content in the form of digital property instances. Generally, the content provider 202 interacts with a user's anchor point domain 204 to provide a uniquely encrypted digital property instance 222 and a signed rights object 232 associated with the encrypted digital property instance 222. The rights object 232 identifies an anchor point 206 storing a binding record that the anchor point 206 can access to allow use of the encrypted digital property instance 222. The rights object 232 also contains usage restriction information and may also hold additional usage rights imposed upon the user. The rights object 232 manages use of the encrypted digital property instance 222 through a digital rights management module 208, although ultimately use of the decrypted digital property instance is controlled by the anchor point 206.

In one implementation, within the user's anchor point domain 204, the anchor point 206, the DRM module 208, and data storage 210 work with the content provider 202 to prepare the uniquely encrypted digital property instance 222 and the signed rights object 232. Once the rights object 232 and encrypted property instance 222 are delivered the content provider 202 need not be involved, although in some implementations, the content provider 202 may become involved again in the future (e.g., to obtained updates to the digital property instance, to obtain replacements of the digital property instance, etc.).

In one implementation, after the encrypted digital property instance 222 and the rights object 232 are transferred to the user's anchor point domain 204, the anchor point 206, the DRM module 208, and data storage 210 work together (without the need to contact the content provider 202) to generate a title key to allow a content handler 214 (e.g., a media player device or software module) to decrypt and a presentation device 216 (e.g., a video display, audio output system, etc.) to present (e.g., play or display) the digital content to the user.

Turning more specifically to the implementation illustrated in FIG. 2, assume the content provider 202 receives a request from the user for specific content. The content (e.g., a digital video title) is a form of digital property that can be embodied in a digital property instance (e.g., a digital video file) from within the content provider 202. Typically, the user and content provider 202 will agree on the licensing terms of the transfer, which represents a broad range of possible transfers. For example, the user can request a 24 hour "rental" of a digital movie title or a perpetual license to play a digital audio title. A goal of the content provider 202 is to transfer an encrypted digital property instance 222 of the requested digital property to the user with confidence that the user will only be able to use the digital property instance in accordance with the agreed upon terms.

In the first stage, that of transferring the digital property instance 212 and rights object 226 to the user's anchor point domain 204, the content provider 202 chooses a random title key 218 ($K_T$), which is generally expected to be unique among all users and transferred digital property instances, even those associated with the same content title. In one implementation, the anchor point 206 provides a title key 218 to the content provider 202 through a secure connection 224. The content provider 202 encrypts a digital property instance 212 with the title key 218 via an encryption module 220 to yield an encrypted digital property instance 222, which is communicated (e.g., downloaded) to the data storage 210 in the user's anchor point domain 204 through wired networking, wireless networking, or physical means (e.g., "sneaker net").

The content provider 202 also contacts the anchor point 206 via the secure connection 224 to obtain a title pre-key. The anchor point 206 generates a title pre-key by encrypting the title key using a binding key, which is stored in a binding record in the anchor point 206. In such an implementation, the binding record in the anchor point may be secured with a binding record pass key and the location of the binding record may be indexed using a binding record identifier. In one specific approach employed over a network, when the user initially requests the content title instance, the user provides a reference (e.g., a URL) to the anchor point 206. The content provider 202 uses this reference to locate the anchor point 206 over the network and to establish the secure connection 224.

The content provider 202 then sends the title key 218 to the anchor point 206 through the secure connection 224. In one implementation, the content provider 202 sends the title key 218 using a create_binding( ) function. Responsive to receipt of the create_binding( ) instruction, the anchor point 206 generates a binding record, which may include data such as a binding record identifier (ID), a binding record passkey, a binding key, one or more signing keys, an output security level, etc. Such data can constitute a binding record data instance, although other combinations of data may be employed. Generally, a binding record data instance includes data that is applicable to allow a user to use an encrypted digital property instance. In one example, a binding record data instance at least includes a binding key that can be used to decrypt a title pre-key to yield a title key that can decrypt an encrypted digital property instance.

The anchor point 206 encrypts the title key using the binding key (randomly generated by the anchor point 206) to yield a first instance of a title pre-key ($K_{Te}$), which is returned to the content provider 202 via the secure connection 224. In one implementation, the anchor point 206 also sends the binding record ID and binding record passkey to the content provider 202 to be embedded in a rights object 226 that will be transmitted to the data storage 210 in the user's anchor point domain 204. At this point, the content provider 202 no longer needs the title key and may delete it from its storage.

In one implementation, the content provider 202 also requests a DRM key from the DRM module 208 in the user's anchor point domain 204. In such an implementation, the content provider 202 uses the DRM key to encrypt the first instance of title pre-key to yield a license key. The content provider 202 has a definition of licensed rights (e.g., in an XML file) to be associated with the transferred encrypted digital property instance 222 and embeds the license key, the binding record ID, and the binding record passkey into the licensed rights definition to yield a rights object 226. Secret information, such as passkeys, may be encrypted prior to being embedded into a rights object, encrypted by some user-supplied secret, so that the user has control over who can use the licensed content.

In one implementation, the rights object 226 is then sent to the anchor point 206 through the secure connection 224 to be signed using a signing key (e.g., randomly generated by the anchor point 206) from an associated binding record in the anchor point 206. In one implementation, the signing key, which is uniquely known to the anchor point 206, applies a message authentication code (MAC) to the rights object 226. The anchor point's signature (e.g., the MAC) is then returned to the content provider 202 via the secure connection 224, joined to the rights object 226 by a joining module 228 to create a signed rights object 232, and transferred to the data storage 210 in the user's anchor point domain 204. The content provider 202 then ceases to interact with the user's anchor point domain 204 as the content provider 202 participates in the creation and delivery of the digital property instance, but has no need to be involved in the user's use of the encrypted digital property instance 222—the user's anchor point domain 204 has all it needs to use the digital property instance. Nevertheless, the content provider 202 may subsequently be invoked to provide beneficial services, including updating and/or replacing digital property instances, etc.

In a second stage, having obtained the encrypted digital property instance 222 and the signed rights object 232, and having generated a binding record in the anchor point 206, the user's anchor point domain 204 can re-generate a title key required to present the content to the user. In one implementation, the stream of title keys are presented to the content handler 214, which decrypts portions of the digital property instance using these keys. For example, a video file may require decryption by a new title key every 10 frames. As such, the anchor point 206 would provide a new title key every 10 frames to allow the content handler 214 to decrypt the next portion of 10 frames.

In one implementation, the DRM module 208 extracts the license key from the signed rights object 232 and decrypts the license key using the DRM module's DRM key to obtain a second instance of a title pre-key. The DRM module 208 can also extract the binding record ID and binding record passkey from the signed rights object 232. The DRM module 208 then passes the second instance of the title pre-key, binding record ID, and the binding record passkey to the anchor point 206 assuming the DRM module 208 can confirm compliance with the licensed rights defined in the signed rights object 232.

With the second instance of the title pre-key and the binding record information, the anchor point 206 can access the appropriate binding record that it has stored, in order to re-generate the title key using its binding key (e.g., the anchor point 206 decrypts the second instance of the title pre-key using the binding key to generate the title key) and can then pass the title key to the content handler 214 to allow decryption of the encrypted digital property instance 222 and presentation of the content by the presentation device 216. It should be understood that, in one implementation, the DRM module 208 passes a stream of title pre-keys to the anchor point 206 to allow the anchor point 206 to pass a stream of title keys to the content handler 214.

It should also be noted, in one implementation, the DRM module 208 employs the anchor point 206 to check the signed rights object 232 to verify that the anchor point's most recent signature is contained within the signed rights object 232. This check guards against tampering with the rights object 232 that might defeat usage restrictions imposed by the DRM module 208. Also, the anchor point 206 re-signs the signed rights object 232 at each processing to update any changes to the licensed rights. For example, if the digital property instance is licensed for a total of fifty presentations, the DRM module 208 decrements the number of available presentations in the rights object 232 to reflect that a number of the available presentations that have been used. The anchor point 206 re-signs the rights object 232 using a modified signing key to make sure that the most updated version of the rights object is used by the DRM module 208.

At this point, the encrypted title instance 222 is retrieved from data storage 210 by the content handler 214, which decrypts the encrypted digital property instance 222 using the title key to yield a digital property instance that can be presented to the user via the presentation device 216 (connected to the content handler 214 through a secure connection 230).

In one alternative implementation, when setting up the binding, the content provider 202 generates a title pre-key, instead of a title key, and sends the title pre-key to the anchor point 206, which generates the title key and returns it to the content provider 202 for use in encrypting the digital property instance 212. In this implementation, the anchor point 206 decrypts the content provider-provided title pre-key using a binding key to obtain the title key that may be securely sent to the content provider 202 for use in encrypting the digital property instance 212. Then. during usage, when the user attempts to decrypt and present the encrypted title instance, the anchor point receives the title pre-key from the DRM module and decrypts the title pre-key using its binding key to obtain the title key.

In yet another alternative implementation, the anchor point 206 generates both the title key and the title pre-key, providing these to the content provider 202.

In the third stage, having obtained the encrypted title instance 212 and the signed rights object 232, the user's anchor point domain 204 can create a backup (i.e. escrow) copy of the active binding record. The anchor point 206 (an example binding record data source) may communicate with a secure anchor point system 240 once the active anchor point 206 has generated an active binding record. In one implementation, binding record data sufficient to restore the active binding record is transmitted from the active anchor point 206 via a secure connection 246 to the secure anchor point system 240 for storage in an escrow anchor point 242 as an escrow binding record 244. The secure anchor point system 240 may be implemented on another user device, such as an external hard drive, memory device, internet storage location, etc. to avoid possible loss of accessing rights if the original binding record is destroyed, lost, tampered with, etc. The escrow anchor point 242 generates the escrow binding recording 244 from the binding record data transmitted from the active anchor point 206.

In an alternative implementation, the binding record data for the escrow anchor point 242 may be retrieved through a secure connection 248 with the content provider 202 (another example binding record data source) and used by the escrow anchor point 242 to generate an escrow binding record 244 for storage in the escrow anchor point 242. In operation, the transmission of binding record data to create the escrow binding record 244 in the escrow anchor point 242 can be achieved by providing the reference of the escrow anchor point 242 to the anchor point 206 or the content provider 202.

In another implementation, the active binding record in the active anchor point 206 and an escrow binding record 244 in an escrow anchor point 242 are created as non-identical twins. Meaning that, although each binding record in a non-identical twin pair is uniquely distinguishable, they both store substantial copies of the same useful information including the binding record identifier and keys. In one implementation, for example, the active and escrow binding records differ from each other in that each binding record stores a reference (e.g., a URL) pointing to the anchor point in which its twin resides, the binding record identifier of its twin, and a flag that is set or cleared to distinguish between the active binding record and the escrow binding record 244.

Figure 3:
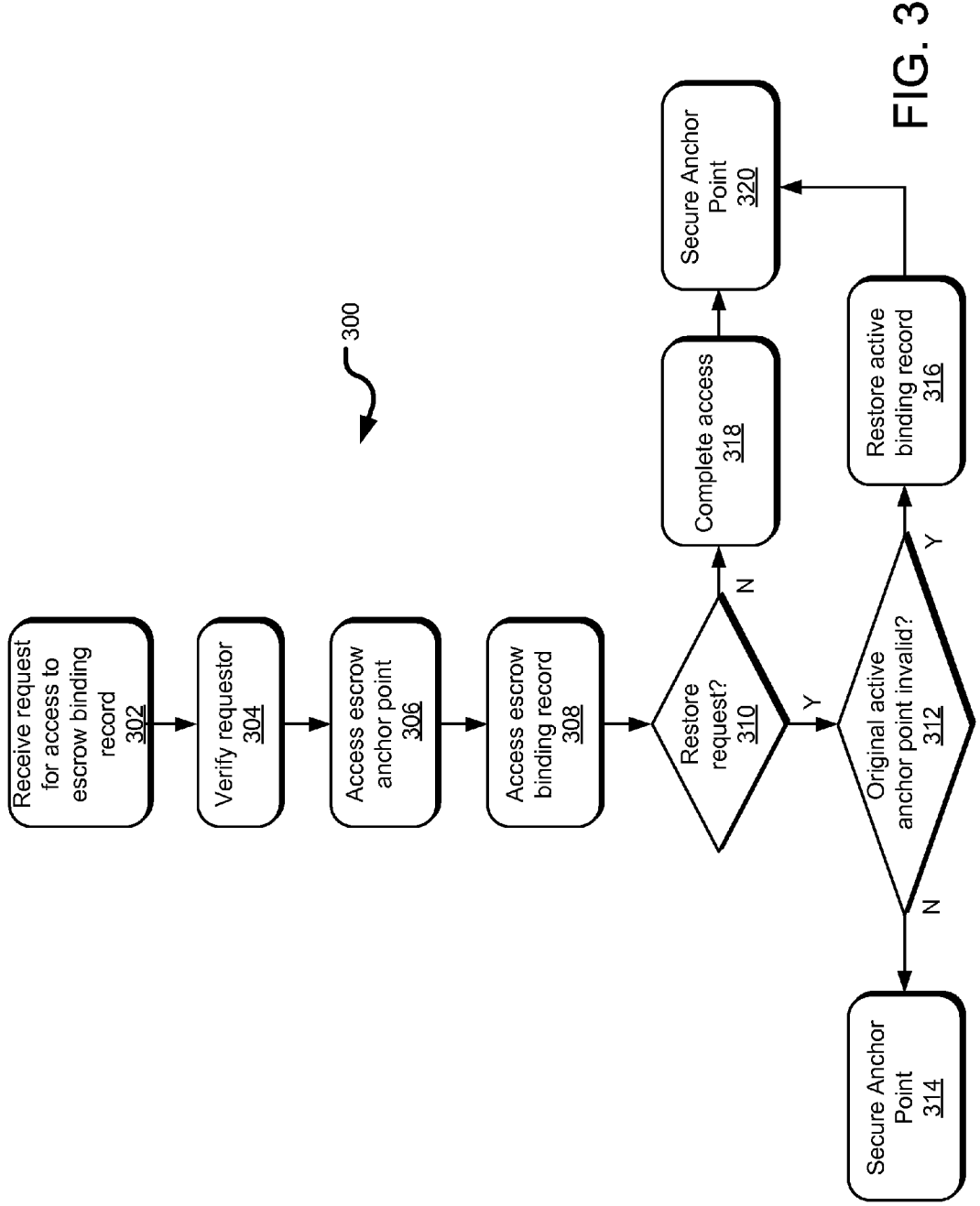
FIG. 3 illustrates example operations for accessing an escrow binding record.

FIG. 3 illustrates example operations 300 for accessing an escrow binding record in a secure anchor point system. Digital content is used through application of an active binding record to generate a title key to decrypt the encrypted digital content. Therefore, maintaining accessibility to the active binding record for authorized users and assuring proper backup procedures may be features of a digital property management process. If a binding record for new content has been added to an active anchor point or if the anchor point is lost or compromised in some manner, then an escrow anchor point may be accessed to backup, modify or restore binding records.

Referring to FIG. 3, at a receiving operation 302, the secure anchor point system receives a request for access to an escrow binding record. In one implementation, the request is received from an active anchor point and is accompanied by the reference of the active anchor point. The secure anchor point system may be operated as an online service and so the request may be received through a network connection. In an alternative implementation, the secure anchor point system may be housed in a physical device (e.g., a secure smart card or circuit device) accessible through a direct link with a device housing an active anchor point.

At verification operation 304, the secure anchor point system verifies that access may be granted to the escrow anchor point. In one implementation, verification may be performed through exchanging of certified identifying information over a secure connection. Generally, a secure communications link is characterized by mutual authentication by public key certificate exchange, session key agreement, and subsequent communication using symmetric encryption, although other secure communications may also be employed.

An access operation 306 grants access to the escrow anchor point, if the request is received from a verified party. An access operation 308 accesses the escrow binding record (e.g., for the purpose of generating, altering, or otherwise accessing the content of the escrow binding record). The appropriate escrow binding record may be identified, for example, by a binding record ID provided with the request. In one implementation, the escrow binding record includes a reference (e.g., a URL) to the original active anchor point.

A decision operation 310 determines what kind of access was requested. If the restoration of an active binding record is requested, then another decision operation 312 determines whether the original active anchor point is invalid. If escrow anchor point cannot determine that the original active anchor point is invalid, then the escrow anchor point treats the request as an error and secures the escrow anchor point in securing operation 314. If the escrow anchor point determines that the original active anchor point is invalid, then a restoring operation 316 accesses binding data from the escrow binding record sufficient to restore the active binding record of the associated anchor point (e.g., the requestor). In one implementation, binding data may include a binding key, a signing key, a binding passkey, anchor point and binding record identifiers, etc., although other combinations of data may be employed. In an alternative implementation, the escrow anchor point creates a new active binding record based on the binding data in the escrow binding record and returns the new active binding record to the new active anchor point. A securing operation 320 closes access to the escrow binding record and the escrow anchor point.

For another (non-restore) type of access, a completion operation 318 completes access to the escrow binding record. For example, in the case of an escrow binding record storage request, the anchor point generates the escrow binding record using the binding data provided in the request and stores it securely). In one implementation, the escrow anchor point receives binding data related to the recently acquired digital property and generates the escrow binding record to incorporate information relating to the recently acquired digital property's data including at least a binding key and binding identifier. This operation is similar to a binding record backup operation. The securing operation 320 closes access to the escrow binding record and the escrow anchor point.

Figure 4:
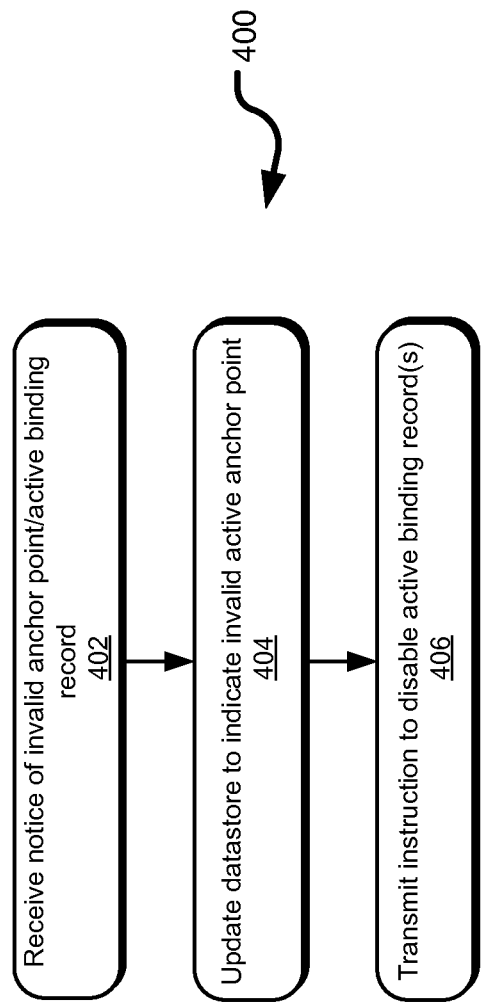
FIG. 4 illustrates example operations providing messaging relating to the disabling an active binding record.

FIG. 4 illustrates example operations providing messaging relating to the disabling and restoring of an active binding record. As briefly discussed with respect to FIG. 3, a secure anchor point system can store an escrow binding record in an escrow anchor point to allow a user additional functionality and security (e.g., backup capacity for binding records) for an instance of digital property that he or she has purchased.

If, for example, a user loses a cell phone containing an active anchor point, he or she may issue a notice that identifies the active anchor point and indicates that all of the binding records in the active anchor point are invalid. As such, referring to FIG. 4, an anchor point message system receives inputs from a number of sources, through one or more communication paths. In one implementation, the anchor point message system receives notices about the security and possession of certain anchor points and binding records. For example, in FIG. 4, a receiving operation 402 receives a notice that an associated active anchor point and/or active binding record has been compromised in some manner, such as, lost, stolen, corrupted, etc. (e.g., that an identified anchor point is invalid). In one implementation, the user can access a binding record backup application that maintains a database of escrow anchor points associated with the user's systems. When one of the systems is lost/compromised/corrupted/etc., the user can execute the binding record backup application, which sends one or more appropriate notices to an anchor point message system indicating that the anchor point is invalid.

An update operation 404 updates information in an anchor point datastore of the anchor point message system to indicate that the identified active anchor point is invalid. A disabling operation 406 transmits an instruction to the active anchor point instructing it to disable one or more of its binding records. In one implementation, the instructions would cause the active anchor point to disable all of its binding records. The active anchor point may receive this instruction, for example, the next time the user's device containing the anchor point connects to the anchor point message system or to another system that is communicating with the anchor point message system. Alternatively, if the active anchor point is embodied in an online anchor point service, then the transmission may be direct through a network without significant delay. Other implementations may be employed.

The operation 402-406 may be executed, for example, if the user has lost his or her cell phone that contains the active anchor point. These operations eventually disable the binding record associated with certain digital content, thereby preventing unauthorized use by a person who may later find and keep the lost cell phone. However, if the user later finds or replaces his lost cell phone, the user may which to re-enable it to use the content. As such, the user would issue a request to restore his or her binding records, which may be handled using operations similar to those described with regard to FIG. 3.

As noted above, use of digital content is limited to devices with access to an active binding record. Therefore, reliable and accessible backups of the digital content, and especially the binding records (into escrow anchor points), adds security and functionality to a comprehensive digital rights management system.

Figure 5:
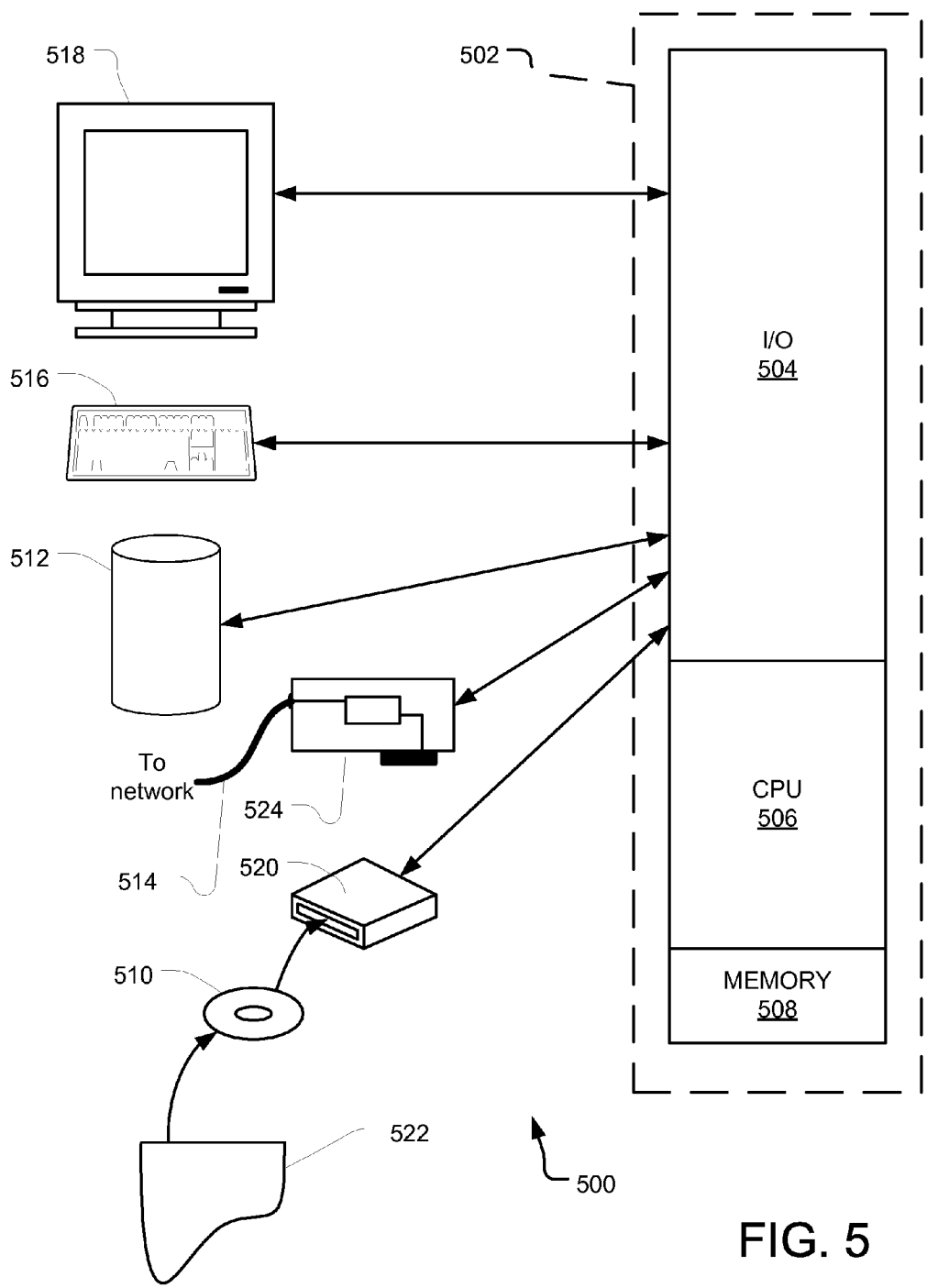
FIG. 5 illustrates an example system that may be useful in implementing the described technology.

FIG. 5 illustrates an example system that may be useful in implementing the described technology. A general purpose computer system 500 is capable of executing a computer program product to execute a computer process. Data and program files may be input to the computer system 500, which reads the files and executes the programs therein. Some of the elements of a general purpose computer system 500 are shown in FIG. 5 wherein a processor 502 is shown having an input/output (I/O) section 504, a central processing unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a distributed computer, a server computer, or any other type of computer. The described technology is optionally implemented in software devices loaded in memory 508, stored on a configured DVD/CD-ROM 510 or storage unit 512, and/or communicated via a wired or wireless network link 514 on a carrier signal, thereby transforming the computer system 500 in FIG. 5 to a special purpose machine for implementing the described operations.

The I/O section 504 is connected to one or more user-interface devices (e.g., a keyboard 516 and a display unit 518), a disk storage unit 512, and a disk drive unit 520. Generally, in contemporary systems, the disk drive unit 520 is a DVD/CD-ROM drive unit capable of reading the DVD/CD-ROM medium 510, which typically contains programs and data 522. Computer program products containing mechanisms to effectuate the systems and methods in accordance with the described technology may reside in the memory section 504, on a disk storage unit 512, or on the DVD/CD-ROM medium 510 of such a system 500. Alternatively, a disk drive unit 520 may be replaced or supplemented by a floppy drive unit, a tape drive unit, a flash memory USB drive, or other storage medium drive unit. The network adapter 524 is capable of connecting the computer system to a network via the network link 514, through which the computer system can receive instructions and data embodied in a carrier wave. Examples of such systems include Power-PC and Intel-based computing systems offered by Apple Corp., personal computers offered by Dell Corporation and by other manufacturers of Intel-compatible personal computers, ARM-based computing systems and other systems running a UNIX-based or other operating system. It should be understood that computing systems may also embody devices such as personal digital assistants (PDAs), mobile phones, gaming consoles, set top boxes, etc.

When used in a LAN-networking environment, the computer system 500 is connected (by wired connection or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are exemplary and other means of and communications devices for establishing a communications link between the computers may be used.

In an exemplary implementation, anchor points, DRM modules, content handlers, and other modules may be incorporated as part of the operating system, application programs, other program modules, or circuit components. Binding records, rights objects, digital property instances various encryption keys and other data may be stored as program data. In such an exemplary implementation, added protections may be needed to protect the secure anchor point functionality. For example, the host system may be placed in a secure location and may present the anchor point functionality remotely.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology and any tamper-resistant security additionally included. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A device comprising:
    an anchor point circuit including:
        a memory;
        a processor configured to:
            receive a first instance of a title key from a digital content provider, the first instance of the title key used to encrypt a digital property to produce an encrypted digital property;
            generate a binding key;
            encrypt the first instance of the title key with the binding key to produce a title pre-key; and
            store the binding key in the memory.

2. The device of claim 1, further comprising:
    the processor further configured to:
        decrypt the title pre-key using the binding key to generate a second instance of the title key; and
        provide the second instance of the title key to a user device associated with the anchor point circuit, the second instance of the title key usable by the user device to decrypt the encrypted digital property.

3. The device of claim 1, further comprising:
    the processor further configured to:
        generate the first instance of the title key and transmit the title key and a request for a digital property instance to a content provider; and
        receive the encrypted digital property from the content provider.

4. The device of claim 1, further comprising:
    the processor further configured to:
        encrypt the binding key with a binding record passkey to produce an encrypted binding record; and
        store the encrypted binding record in the memory in a location identified by a binding record identifier.

5. The device of claim 4, further comprising:
    the processor further configured to:
        transmit the title pre-key, the binding record passkey, and the binding record identifier to the content provider; and
        receive a rights object from the content provider incorporating the title pre-key, the binding record passkey, and the binding record identifier.

6. The device of claim 5, further comprising:
    the processor further configured to provide the rights object to the user device.

7. The device of claim 5, further comprising:
    the processor further configured to:
        receive the title pre-key, the binding record passkey, and the binding record identifier from the user device;
        use the binding record identifier to locate the encrypted binding record; and
        decrypt the encrypted binding record using the binding record passkey to produce the binding record.

8. The device of claim 5, further comprising:
    the processor further configured to:
        transmit a message authentication code to the content provider, the content provider using the message authentication code to create a signed rights object and sending the second signed rights object to the user device.

9. The device of claim 8, further comprising:
    the processor further configured to:
        receive the signed rights object from the user device; and
        verify the message authentication code of the first signed rights object prior to decrypting the title pre-key using the binding key to generate a second instance of the title key.

10. The device of claim 1, the anchor point circuit comprising a secure, unique, hard-to-falsify physical object.

11. A method comprising:
    encrypting a title key with a binding key in a first anchor point circuit to produce a title pre-key, the title key used to encrypt a digital property;
    providing the title pre-key from the first anchor point circuit to a user device associated with the first anchor point circuit; and
    storing the binding key in a secure memory of the first anchor point circuit.

12. The method of claim 11, further comprising:
    receiving the title pre-key from the user device at the first anchor point circuit;
    decrypting the title pre-key using the binding key at the first anchor point circuit to generate the title key; and
    providing the title key to from the first anchor point circuit to a content handler of the user device to decrypt the digital property.

13. The method of claim 11, further comprising:
    encrypting a plurality of title keys at the first anchor point circuit to produce a plurality of title pre-keys, each of the plurality of title keys used to encrypt a portion of the digital property; and
    receiving a stream of the plurality of title pre-keys at the first anchor point circuit from the user device.

14. The method of claim 13, further comprising:
    decrypting each title pre-key in the stream at the first anchor point circuit in order to generate a stream of title keys; and
    providing the stream of title keys from the first anchor point circuit to the content handler of the user device.

15. The method of claim 11, further comprising: the first anchor point circuit further configured to:
    generating, at the first anchor point circuit, an escrow binding record including a reference to the first anchor point circuit and a substantial copy of the binding key capable of encrypting the title key to generate the title pre-key or decrypting the title pre-key to generate the title key;
    storing the escrow binding record in a secure escrow anchor point that is physically distinct from the first anchor point circuit, the escrow binding record including data sufficient to restore the binding key in the first anchor point circuit; and restoring the binding key to a second anchor point circuit using the escrow binding record of the secure escrow anchor point, the restoring including transmitting the binding key to the second anchor point circuit.

16. The method of claim 15, restoring the binding key to a second anchor point circuit further comprising:
receiving a request from the second anchor point circuit to restore the binding key associated with the escrow binding record;
determining whether the first anchor point circuit is invalid; and
restoring the binding key to the second anchor point circuit using the escrow binding record of the secure escrow anchor point if the first anchor point circuit is determined to be invalid.

17. A system comprising:
an interface configured to communicate with a content provider;
an anchor point circuit configured to:
bind a digital property received from the content provider to the anchor point circuit such that the digital property can only be used in conjunction with the anchor point circuit.

18. The system of claim 17, further comprising:
a memory configured to store an encrypted digital property and a rights object associated with the encrypted digital property, the rights object including a title pre-key, the encrypted digital property being encrypted by the content provider with a first instance of a title key, the first instance of the title key being encrypted with a binding key to yield the title pre-key;
the anchor point circuit configured to:
encrypt the first instance of the title key with the binding key to generate the title pre-key; and
storing the binding key and deleting the first instance of the title key.

19. The system of claim 18, further comprising:
the anchor point circuit further configured to:
receive the title pre-key stored in the memory and decrypt the title pre-key using the binding key to yield a second instance of the title key; and
a content handler to securely receive the second instance of the title key from the anchor point circuit and to receive the encrypted digital property from the memory, the content handler being further configured to decrypt the encrypted digital property instance using the second instance of the title key.

20. The system of claim 17, the anchor point circuit comprising a secure, unique, hard-to-falsify physical object.

21. The system of claim 17, further comprising:
the anchor point circuit configured to bind the digital property to the anchor point by:
encrypting a title key with a binding key to produce a title pre-key, the title key used to encrypt the digital property to generate an encrypted digital property;
receiving a rights object to access the encrypted digital property, the rights object including the title pre-key and a binding record identifier identifying the binding key;
using the binding key to decrypt the title pre-key to produce the title key;
securely transmitting the title key to a content handler; and
the content handler configured to decrypt the encrypted digital property using the title key.

22. The system of claim 21, further comprising:
a digital rights management (DRM) module configured to manage usage of the digital property based on licensing terms associated with the digital property.

23. The system of claim 22, further comprising:
the DRM module configured to manage usage of the digital property based on licensing terms by:
providing a DRM key to the content provider, the DRM key used to encrypt the title pre-key to generate a license key, the license key included in the rights object along with a set of licensed rights;
receiving the rights object including licensed rights and license key; and
decrypting the licensed key to produce the title pre-key after verifying compliance with the licensed rights.

24. The system of claim 17, further comprising the anchor point circuit further configured to:
generate an escrow binding record including a reference to the anchor point circuit and a substantial copy of the binding key capable of encrypting the title key to generate the title pre-key or decrypting the title pre-key to generate the title key; and
store the escrow binding record in a secure escrow anchor point that is physically distinct from the anchor point circuit, the escrow binding record including data sufficient to restore the binding key in the anchor point circuit.

* * * * *